Figure 1:
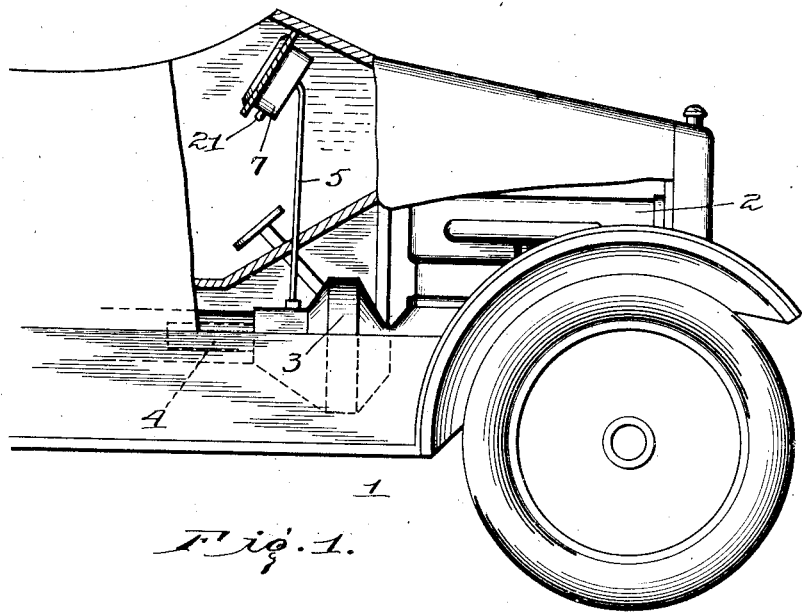

Jan. 16, 1923.                R. WATSON.                1,442,312.
MEANS FOR CONTROLLING THE IGNITION CIRCUITS OF AUTOMOBILE ENGINES.
ORIGINAL FILED DEC. 2, 1920.

Inventor
Robert Watson

Patented Jan. 16, 1923.

1,442,312

UNITED STATES PATENT OFFICE.

ROBERT WATSON, OF SILVER SPRING, MARYLAND.

MEANS FOR CONTROLLING THE IGNITION CIRCUITS OF AUTOMOBILE ENGINES.

Application filed December 2, 1920, Serial No. 427,730. Renewed May 11, 1922. Serial No. 560,250.

*To all whom it may concern:*

Be it known that I, ROBERT WATSON, a citizen of the United States, residing at Silver Spring, in the county of Montgomery and State of Maryland, have invented certain new and useful Improvements in Means for Controlling the Ignition Circuits of Automobile Engines, of which the following is a specification.

This invention relates to means for preventing needless idling of internal combustion engines used for driving motor vehicles and also to means for preventing waste of the electric current, where battery ignition systems are employed in connection with such engines. In the operation of motor-driven vehicles, particularly trucks and delivery wagons, equipped with internal combustion motors, waste of fuel and needless wear and tear on the motor occur by reason of the failure of the operator to stop the motor when the vehicle is stopped for loading or unloading, delivering packages, etc., and similar waste and wear occur by reason of the operator starting the engine and allowing it to run idly for an unnecessarily long period of time before he is ready to start the vehicle. This practice occurs more particularly in the operation of vehicles which are not provided with automatic starters, and with such vehicles a careless operator will often allow the engine to idle during long stops of the vehicle, to avoid the trouble of starting the engine by a hand crank. Also, where the engine is equipped with a battery ignition system, the switch for closing the primary circuit thereof may carelessly be left in the on position for long periods while the motor is stopped, with the result that the battery may discharge through the generator or spark coil unless protective devices are inserted to prevent such discharge.

In order to prevent this needless idling and to prevent the discharge of the battery, I have provided means in the present invention whereby the primary circuit of a battery ignition system will be automatically opened in a predetermined time after the closure of said circuit by the operator, unless the operator starts the vehicle in the meantime. The starting and running of the vehicle prevent the operation of the circuit opening means, but when the vehicle is brought to a stop said means again becomes effective and the circuit is opened automatically to stop the engine, after a short delay, unless the operator in the meantime again starts the vehicle or manually opens said circuit to stop the engine. If the operator stalls the engine and leaves the ignition circuit closed, or for any reason leaves the circuit closed while the vehicle is not in use, the circuit will be automatically opened after a short delay and the discharge of the battery will be prevented.

Figure 2:
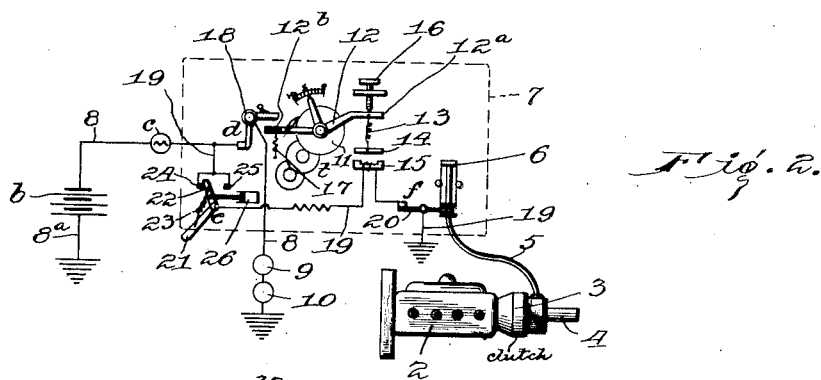
Figure 3:
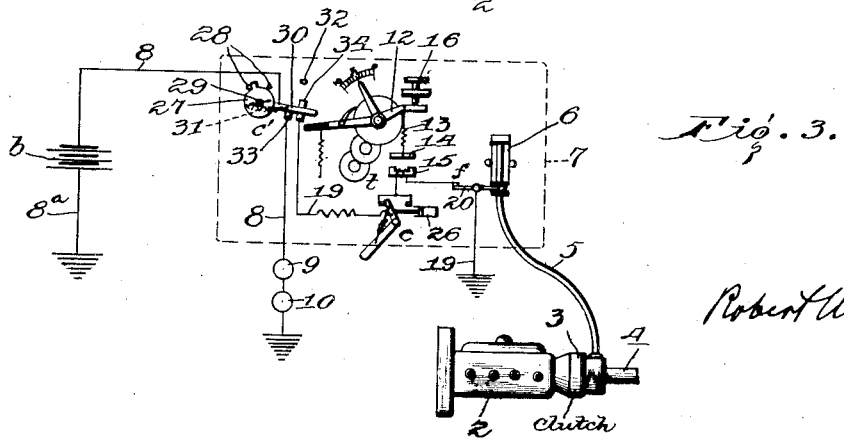

In the accompanying drawing,

Fig. 1 is a side elevation, partly broken away, of a vehicle equipped with an internal combustion driving motor and provided with my improvements;

Fig. 2 is a diagrammatic view illustrating a form of the invention in which the circuit of the magnet which actuates the time mechanism is not controlled by the time mechanism; and, Fig. 3 is a similar view illustrating another form of the invention in which the time mechanism operates to interrupt the circuit of the magnet which controls the time mechanism after the ignition circuit has been opened by said mechanism.

Referring to the drawing, 1 indicates a motor vehicle having an internal combustion driving motor 2 and the usual clutch, contained in a casing 3, for connecting the motor to the drive shaft 4, which operates the driving axles of the vehicle through differential gearing, in the usual manner. The shaft 4 operates a flexible shaft 5, which is connected to a centrifugal governor 6, contained in a suitable casing 7, the latter being indicated in dotted lines in the diagrams.

In the diagrams, the primary circuit of a battery ignition system for the motor is shown, the secondary connections to the spark plugs being omitted. In Fig. 2, the battery is indicated at $b$, and the primary circuit 8 extends from one pole of the battery to the usual key-controlled switch $c$, by which the operator opens and closes the circuit, thence through a normally closed switch $d$, thence to the spark coil indicated at 9, circuit breaker and distributor 10, thence to ground and to the battery through ground connection $8^a$.

A time mechanism $t$ is provided for opening the switch $d$, to interrupt the ignition circuit in a predetermined time after the closure of the circuit at the manually controlled switch c. The time mechanism comprises a clocktrain 11, operable by a centrally pivoted ratchet lever 12, to one arm 12ª of which is connected a short spring 12ª, which constitutes the main spring of 13, the clocktrain. This spring is connected to the armature 14 of an electromagnet 15. When the magnet is energized, the armature is attached and tension is thereby applied to the spring for operating the clocktrain. When the magnet is de-energized, the main spring is relaxed and the arm 12ª is pulled back to its normal position against an adjustable stop 16 by a light spring 17, attached to the arm 12ᵇ of the lever. The arm 12ᵇ of the lever extends under one arm of a bell crank lever 18, which constitutes the movable member of the switch d, and when the ratchet lever moves a certain distance from its normal position it engages the switch member and moves it to open position, thus interrupting the ignition circuit.

The magnet 15 for operating the clocktrain is connected in a circuit 19, which extends from the ignition circuit, at a point between the switches c and d, through a manually controlled switch e to a switch f, controlled by the governor 6, and thence to ground. The movable member of the switch f, indicated as a centrally pivoted lever 20, is normally held in closed position by the governor while the vehicle is stopped, but is moved to open position when the vehicle starts, the governor being operated by a driven part of the vehicle, such as the propeller shaft 4. The switch e is normally closed, but may be opened by the operator for a few moments only, when desired, to interrupt the circuit of the magnet and allow the ratchet lever to move backward on the clocktrain to its normal position. This switch e may be of any design suitable for permitting the operator to momentarily open the magnet circuit, without permitting him to maintain the circuit open. The switch illustrated in the drawing is a well known form of switch comprising a handle 21 and switch blade 22, mounted upon a common pivot and connected by a spring 23, which causes the switch blade to move from a fixed contact 24 to a like contact 25, or vice versa, when the handle is moved to carry the spring past the pivotal point of the switch. These fixed contacts are electrically connected together, so that the magnet circuit is only interrupted during the interval while the switch arm is moving from one fixed contact to the other. The period of interruption should be long enough to allow the armature to leave the magnet and to permit the spring 17 to move the ratchet lever back to its stop. For this purpose, a retarding device, indicated as a dashpot 26, is connected to the switch blade to cause a slight delay in the movement of the blade. The end of the handle projects without the casing 7 so as to be accessible to the operator.

The operation of the mechanism shown in Fig. 2 is as follows: When the operator closes the ignition circuit at the key-controlled switch c, the magnet is energized and attracts its armature which applies tension to the main spring 13. The ratchet lever, pulled by this spring, imparts movement to the clocktrain and the lever, moving with the clocktrain, opens the switch d and interrupts the ignition circuit in a predetermined time after the closure of the switch c, unless the circuit of the magnet is interrupted at the switch f, by the starting of the vehicle, or at the switch e, by the operator. Thus, if the operator closes the ignition circuit at the switch c, preparatory to starting the motor and vehicle, but does nothing further, the switch d will be opened automatically by the clocktrain after a short period of time, the duration of which is determined by the setting of the stop 16, which regulates the travel of the ratchet lever with the time mechanism. The time mechanism will stop after the switch d has been opened, owing to the running down of the short main spring 13, but the magnet will hold the ratchet lever away from normal position, with the switch d open, as long thereafter as switch c remains closed, and the battery will be prevented from discharging through the ignition circuit. By opening the switch c, the magnet will be de-energized and the ratchet lever will be allowed to rock back to its normal position and this will permit the switch d to close again. If the operator closes the ignition circuit at the switch c and starts the motor, but does not start the vehicle within the time required for the time mechanism to open the switch d, the latter switch will open and cause the stoppage of the motor, thus preventing needless idling of the motor. If the operator starts the vehicle within the predetermined time, the switch f opens automatically and interrupts the magnet circuit, and the magnet releases its armature and allows the ratchet lever to move back to its normal position against the stop, where it remains as long as the vehicle is running. When the vehicle is brought to a stop, the switch f is automatically closed, thus completing the magnet circuit. The magnet then starts the time mechanism and if the operator does not stop the motor or start the vehicle within the time allowed for the time mechanism to open the switch d, the latter will be opened automatically and the motor will be stopped. It sometimes happens that the operator, while bringing the vehicle slowly to a stop, as when putting it in a garage, will stall the motor and leave the vehicle standing without opening the ignition circuit. When this occurs, the time mechanism will open the circuit in a short time and thereby prevent the discharge of the battery. The magnet will remain energized until the operator opens the circuit at the switch c, but as this magnet requires only a very small quantity of current to energize it, the loss of current through the magnet circuit is trifling.

It will be seen from the foregoing that the apparatus of Fig. 2 will prevent unnecessary idling of the motor during ordinary stops of the vehicle and will prevent discharge of the battery in case the operator leaves the key-controlled switch in closed position when the vehicle is not in use. When the vehicle, while en route, is stopped by the traffic, it may be desirable to permit the operator to keep the motor idling for a period longer than that for which the time mechanism is set to act. In that case, the operator may prolong the idling time of the motor by operating the switch e at intervals of a few minutes. Each time said switch is operated, the magnet circuit is broken long enough to de-energize the magnet and allow the ratchet lever to move back with respect to the time mechanism against its stop, and the magnet circuit is then immediately established and the lever commences to move forward again with the time mechanism. Thus, the idling time can be prolonged at the will of the operator while the vehicle is stopped by the traffic and the operator remains in the vehicle; but during ordinary stops, where the operator leaves the vehicle, the motor will be automatically stopped by the operation of the time mechanism if the operator fails to stop it.

The apparatus shown in Fig. 3 functions the same as the apparatus of Fig. 2, and, in addition, breaks the circuit of the magnet when the ignition circuit is opened to stop the motor. The corresponding parts in Figs. 2 and 3 are similarly numbered. In Fig. 3 the ignition circuit has but one switch c', and this switch may be operated manually to open and close the circuit and is operable also by the time mechanism to open the circuit in a predetermined time after its closure, providing the vehicle is not started in the meantime. The switch c' also opens and closes the circuit of the magnet which controls the operation of the time mechanism. As shown, a disk 27, which may be enclosed and oscillated by means of a key between stops 28, is mounted to turn about the axis of a pin 29, upon which a switch arm 30 is pivoted. The arm and disk are connected by a spring 31 in such manner that when the disk is oscillated, between these stops, the spring will be carried past the pivot and will cause the switch arm to move quickly from the open position, against a stop 32, to the closed position against a fixed contact 33, or vice versa, according to the direction in which the disk is turned. The switch arm projects into the path of movement of the ratchet lever 12 of the time mechanism, and it will be obvious that when the switch is closed and the time mechanism is in operation, the ratchet lever will move the switch arm to open the ignition circuit at the contact 33, and a continuation of the movement of the lever will cause the switch arm to move the spring 31 over the pivotal point of the arm and the latter will then spring over against the stop 32 and remain in open position until it is again manually moved to closed position. The magnet circuit 19 has a contact 34 which is engaged by the switch arm in the closed position of the latter, and thus the magnet is energized and commences to actuate the clocktrain as soon as the switch c' is closed. If the magnet circuit is not broken at the switch f by the starting of the vehicle, or at the switch e, to prolong the idling time of the motor, the time mechanism will in a predetermined time after the closure of said circuit, first open the ignition circuit at the contact 33 and, after carrying the switch arm 30 past its central position, open the magnet circuit at the contact 34 which is extended beyond the contact 33 far enough to keep the magnet circuit closed and the clocktrain in operation until the switch arm is thrown past its center to the off position. In the off position of the switch no current can flow through either the ignition circuit or the magnet circuit. The switch f functions as in Fig. 2, to open the magnet circuit and thereby prevent the stoppage of the motor by the time mechanism while the vehicle is in operation, and to close the magnet circuit when the vehicle is brought to a stop, so that the motor will be stopped by the time mechanism in a short time if the operator fails to stop it when the vehicle is stopped. The switch e in Fig. 3 is movable by the operator to temporarily interrupt the magnet circuit and prolong the idling time in the same manner as the correspondingly lettered switch of Fig. 2, and the adjustment of the time required for the time mechanism to open the ignition circuit is effected by the adjustable stop 16, as in Fig. 2.

The purpose of making the parts 27 and 30 of the switch c' independently movable is to prevent the operator from holding the switch in closed position against the action of the time mechanism.

What I claim is:

1. The combination with a motor vehicle having an internal combustion motor and an ignition circuit for the motor of a manually controlled switch for rendering said circuit operative, and means for rendering said circuit inoperative in a predetermined time after it is rendered operative by said switch and while the motor is idling.

2. The combination with a motor vehicle having an internal combustion engine and an ignition circuit for the motor of a manually controlled switch for rendering said circuit operative, means for rendering said circuit inoperative in a predetermined time after it is rendered operative by said switch and while the motor is idling, and means for preventing the operation of said first mentioned means while the vehicle is in motion.

3. The combination with a motor vehicle having an internal combustion motor and an ignition circuit for the motor of a manually controlled switch for rendering said circuit operative, means for rendering said circuit inoperative in a predetermined time after it is rendered operative by said switch and while the motor is idling, and means controlled by the vehicle for preventing the operation of said first mentioned means while the vehicle is in motion.

4. The combination with a motor vehicle having an internal combustion driving motor and an ignition circuit for the motor, of a manually operated switch for closing said circuit, and means independent of the ignition circuit for interrupting said circuit in a predetermined time after its closure by said switch while the motor is idling.

5. The combination with a motor vehicle having an internal combustion driving motor and an ignition circuit for the motor, of a manually operated switch for closing said circuit, means for interrupting said circuit in a predetermined time after its closure by said switch, and means operated by a driven part on the vehicle for preventing the operation of said first mentioned means while the vehicle is running.

6. The combination with a motor vehicle having an internal combustion driving motor and an ignition circuit for the motor, of a manually operated switch for closing said circuit, means for interrupting said circuit comprising time mechanism, a magnet for causing the operation of said mechanism, and a circuit for said magnet independent of the ignition circuit adapted to be closed by said switch.

7. The combination with a motor vehicle having an internal combustion driving motor and an ignition circuit for the motor, of a manually operated switch for closing said circuit, means for interrupting said circuit comprising time mechanism, a magnet for causing the operation of the time mechanism and a circuit for said magnet adapted to be closed by said switch, and means operated by a driven part on the vehicle for de-energizing the magnet when the vehicle starts.

8. The combination with a motor vehicle having an internal combustion driving motor and an ignition circuit for the motor, of a manually controlled switch for opening and closing said circuit, time mechanism for opening said switch, a magnet for causing the operation of the time mechanism, and a circuit for said magnet independent of the ignition circuit adapted to be opened and closed by said switch.

9. The combination with a motor vehicle having an internal combustion driving motor and an ignition circuit for the motor, of a manually controlled switch for opening and closing said circuit, time mechanism for opening said switch, a magnet for causing the operation of the time mechanism, and a circuit for said magnet adapted to be opened by said switch subsequently to the opening of the ignition circuit.

10. The combination with a motor vehicle having an internal combustion driving motor and an ignition circuit for the motor, of a manually controlled switch for opening and closing said circuit, time mechanism for opening said switch, a magnet for causing the operation of the time mechanism, a circuit for said magnet adapted to be opened and closed by said switch, and a switch in the magnet circuit controlled by a driven part on the vehicle.

11. The combination with a motor vehicle having an internal combustion driving motor and an ignition circuit for the motor, of a manually controlled switch for opening and closing said circuit, time mechanism for opening said switch, a magnet for causing the operation of the time mechanism, a circuit for said magnet including said switch, and manually controlled means for temporarily de-energizing the magnet without opening said switch.

12. The combination with a motor vehicle having an internal combustion driving motor, and an ignition circuit for the motor, of a manually controlled switch for closing said circuit and means for opening said circuit in a predetermined time after its closure comprising a clock train, a magnet for operating the clock train and a circuit for said magnet controlled by said switch.

13. The combination with a motor vehicle having an internal combustion driving motor, and an ignition circuit for the motor, of a manually controlled switch for closing said circuit and means for opening said circuit in a predetermined time after its closure comprising a clock train, a ratchet lever for moving the clock train, a magnet for moving said lever from an initial position to actuate the clock train, a circuit for said magnet controlled by said switch, and means for restoring said lever to its initial position when the magnet circuit is opened.

In testimony whereof I affix my signature.

ROBERT WATSON.